United States Patent

Prager et al.

[11] 4,041,905
[45] Aug. 16, 1977

[54] ANIMAL GROOMING APPARATUS HAVING IMPROVED TETHERING DEVICE

[76] Inventors: Charles H. Prager, 6105 N. 116th St., Milwaukee, Wis. 53225; John J. Seller, 10414 E. Jefferson Road, Osecola, Ind. 46561

[21] Appl. No.: 633,551

[22] Filed: Nov. 19, 1975

[51] Int. Cl.² .............................................. A01K 29/00
[52] U.S. Cl. .................................... 119/103; 119/117
[58] Field of Search ................. 119/103, 96, 109, 106, 119/110, 126, 117, 102; 43/20; 242/107.5, 156, 110, 96, 106

[56] References Cited
U.S. PATENT DOCUMENTS

| | | | |
|---|---|---|---|
| 1,053,612 | 2/1913 | Keyes | 242/106 |
| 3,123,052 | 3/1964 | Marshall | 119/109 |
| 3,266,464 | 8/1966 | Davis | 119/103 |
| 3,423,044 | 1/1969 | Beiderwell | 242/96 |
| 3,580,222 | 5/1971 | Dunn | 119/102 |

*Primary Examiner*—Louis G. Mancene
*Assistant Examiner*—Peter K. Skiff
*Attorney, Agent, or Firm*—Andrus, Sceales, Starke & Sawall

[57] ABSTRACT

A tethering device includes a tether cord wrapped around a friction braked drum. The drum serves to store the cord when the tether is in a shortened condition for holding the animal in position on an elevated grooming table. Should the animal fall off the table, the cord is unwound from the drum to avoid injury to the animal.

5 Claims, 3 Drawing Figures

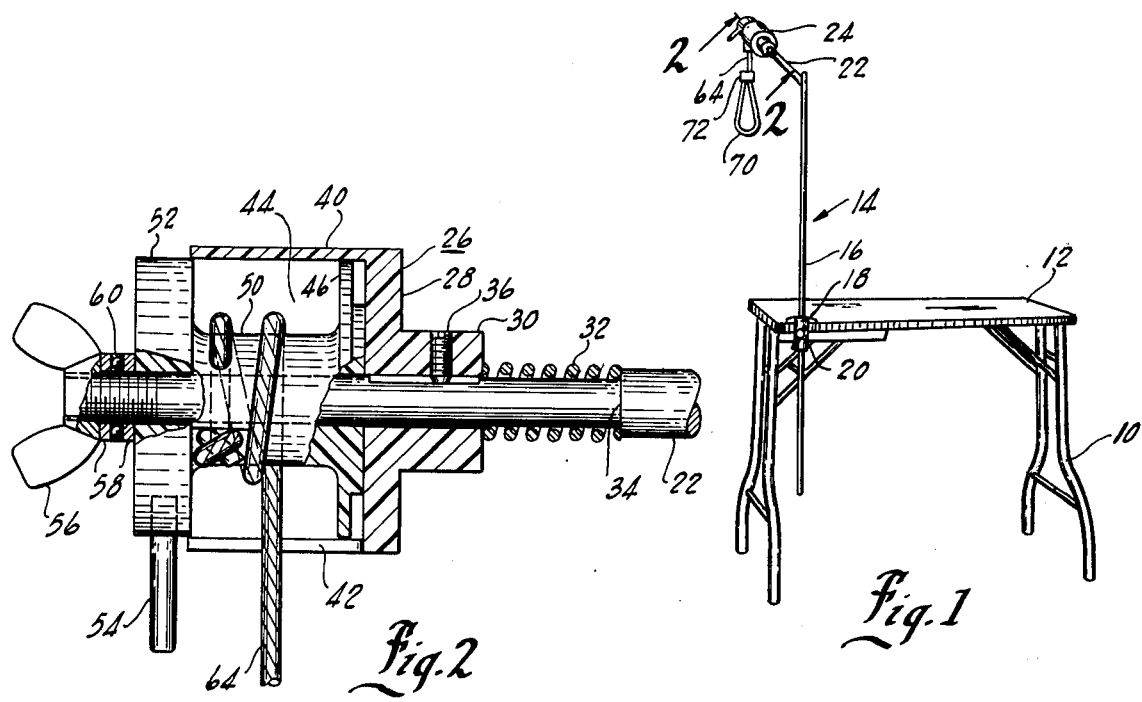
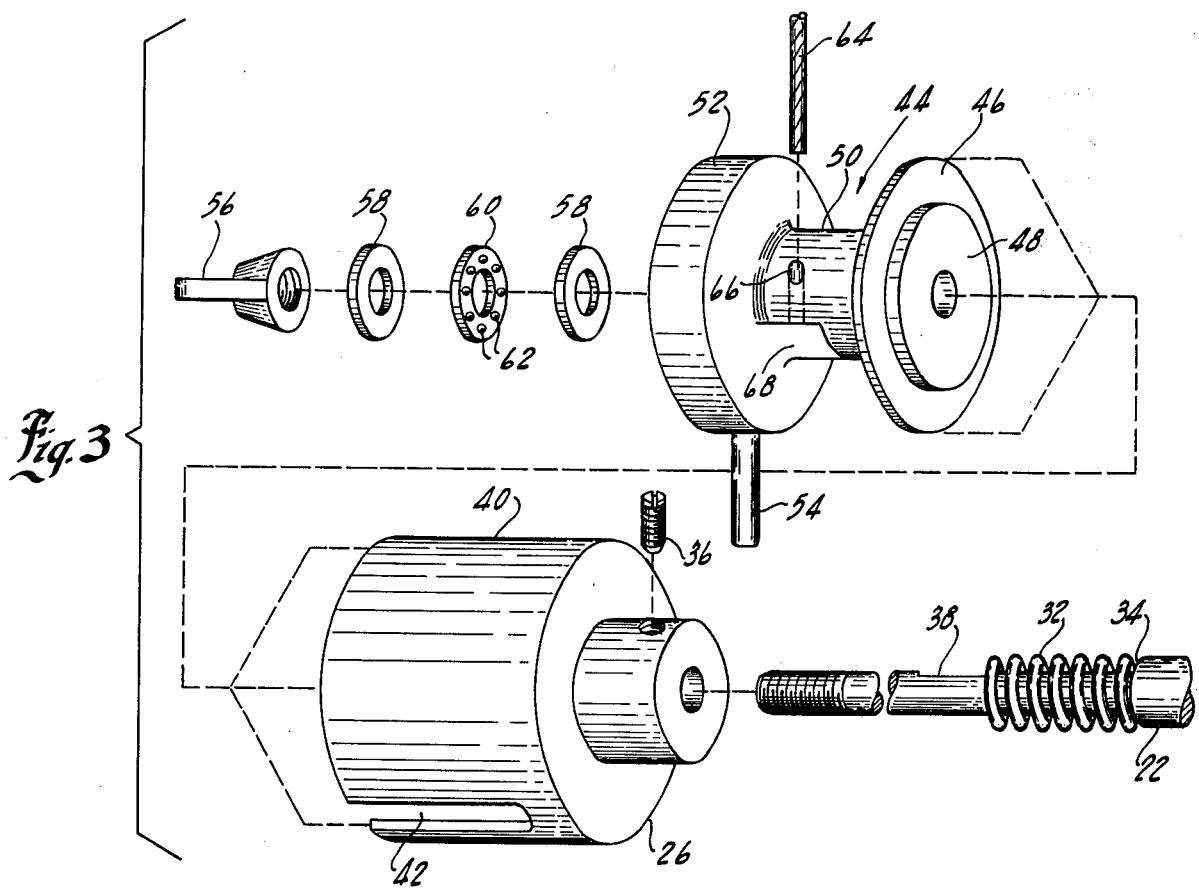

ANIMAL GROOMING APPARATUS HAVING IMPROVED TETHERING DEVICE

BACKGROUND OF THE INVENTION

1. Field of the Invention

The present invention relates to animal grooming apparatus.

2. Description of the Prior Art

In the grooming of animals, for example, show dogs, the animal is customarily placed on a table, the work surface of which is positioned to a convenient height for working on the animal. The animal is restrained by a tether. The tether has a noose at one end which is placed over the animal's head and tightened around its neck. The other end of the tether is attached to the arm of a grooming post fastened on the edge of the table.

Should the animal jump or be pushed off the elevated table while restrained by the noose, injury to the animal is almost certain. Depending on the size of the animal, strangulation may result. Given the cost of breeding, maintaining, and showing prize animals, this hazard is most serious in nature.

SUMMARY OF THE PRESENT INVENTION

It is, therefore, the object of the present invention to provide an improved tethering device for grooming apparatus which prevents injury to the animal should it become displaced from the grooming table. The present invention incorporates a tether cord which is extendible in the event the animal jumps or falls off the table, thereby to avoid injury to the animal. At the same time the device keeps the animal connected to the table so that it does not become loose.

The device includes a friction braked drum which stores the tether cord when in the shortened grooming position and which is rotated by the tensile forces generated on the cord by the weight of the animal falling off the table to pay out the tether cord as the animal falls.

BRIEF DESCRIPTION OF THE DRAWING

FIG. 1 is a perspective view of a grooming table and post showing the improved tethering arrangement of the present invention.

FIG. 2 is an enlarged cross sectional view of the tethering arrangement of the present invention taken along the line 2—2 of FIG. 1.

FIG. 3 is an exploded perspective view of the tethering arrangement of the present invention.

DESCRIPTION OF THE PREFERRED EMBODIMENT

In FIG. 1, a grooming table is identified by the numeral 10. Table 10 includes work surface 12 on which an animal may be placed for grooming. Work surface 12 positions the animal at a height convenient for grooming and, as such, may be a considerable distance above the floor.

Grooming post 14 is mounted on one edge of work surface 12. Grooming posts 14 includes upright 16, adjustably positioned in bracket 18 by clamp 20, and an arm 22 extending over work surface 12. Tethering device 24 of the present invention is mounted on the end of arm 22.

Tethering device 24 includes circular housing 26 through which arm 22 extends. Housing 26 includes a circular base 28 containing hub 30. A spring 32 is compressed between hub 30 and shoulder 34 on arm 22. Housing 26 is prevented from rotating with respect to arm 22 by set screw 36 which engages flat 38 of arm 22. However, housing 26 may slide along arm 22 without rotating. It will be appreciated that other means, such as a tongue on hub 30 and a groove on arm 22, may be employed to provide sliding motion while preventing rotary motion. Housing 26 also contains cylindrical side wall 40 containing slot 42.

Drum 44 is rotatably mounted on arm 22 within housing 26. Drum 44 includes flange 46 containing disc 48 which abuts the inner surface of base 28 of housing 26. Drum 44 also contains central portion 50 and a second flange 52 which extends beyond housing side wall 40. Pin 54 is embedded in flange 52 to enable a user of tethering device 22 to rotate drum 44 by grasping pin 54.

The end of arm 22 is threaded and contains wing nut 56. Wing nut 56 is spaced from flange 52 of drum 44 by washers 58 and bearing 60 which permits wing nut 56 and drum 44 to rotate independently of each other. While bearing 60 is shown as a thrust bearing containing balls 62 in the Figures, it will be appreciated that other means, for example, a washer of lubricous material such as nylon, may be employed.

One end of tether 64 is secured in drum 44 by inserting the end in hole 66 in central portion 50 and tying a knot in the end. A flat 68 may be provided in central portion 50 to accommodate the knot. The other end of tether 64 contains noose 70 which is adjustable by slide 72.

In operation, wing nut 56 is tightened to press disc 48 of drum 44 into contact with the inner surface of circular base 28 of housing 26 and against the bias force exerted by spring 32. The amount of tightening of wing nut 56 determines the degree of friction between the two members and the ease with which drum 44 may be rotated. For the grooming of small animals, only a small amount of friction is employed, whereas for larger animals, wing 56 is tightened to a greater extent to provide a greater degree of friction between drum 44 and housing 26.

Tether 64 is wound on drum 44 by rotating the drum with pin 54 until noose 70 is positioned in a desired distance about work surface 12. The amount of friction existing in tether device 22 may be checked by pulling on tether 64.

The head of the animal to be groomed is inserted in noose 70. The noose is tightened by moving slide 72 along tether 64 to restrain the animal during grooming. The friction provided in tethering device 22 between disc 48 of drum 44 and base 28 of housing 26 prevents unwinding and lengthening of tether 70 during the normal movements of the animal occurring during grooming. However, should the animal jump or be pushed off work surface 12, the weight of the animal is sufficient to overcome the friction between drum 44 and base 28 and allow tether 64 to lengthen as the animal falls to the floor, thereby avoiding injury to the animal and damage to table 10. Inasmuch as one end of tether 64 is fixed to drum 44, the animal remains connected to table 12 and cannot escape.

If desired, tether 64 may terminate in a loop suitable for fastening the end of a separable leash, noose, or other restraining device. Various modes of carrying out the invention are contemplated as being within the scope of the following claims particularly pointing out and distinctly claiming the subject matter which is regarded as the invention.

We claim:

1. In apparatus for grooming animals having a grooming post arm with an end terminating above a raised work surface, an improved tethering device comprising:

a tether formed of a cord having means at one end suitable for use in restraining the animal; and a tether control mounted on the arm, said tether control including;

a drum rotatably mounted on the arm so that the arm serves as an axle, said drum having first and second axially spaced flanges lying normal to the drum, said first flange being located adjacent the end of said arm, said second flange being spaced inwardly along the arm from the end and having an exposed planar outer surface, said cord being wrapped and unwrapped on said drum between said flanges for storing and paying out purposes, a generally cup-shaped housing mounted on the arm beyond said second flange, said housing having a base through which the arm extends and presenting a planar surface normal to the arm, said housing including a tubular wall extending parallel to the arm, said housing internally receiving said drum within said tubular wall with said planar outer surface of said second flange contiguous with said planar surface of said base, said wall having a slot therein through which said cord extends, said housing containing means engagable with the arm for restraining rotation of said housing with respect to the arm while permitting axial movement of said housing along the arm, resilient means mounted on said arm exteriorly of, and beyond, said housing and bearing on said housing for urging said housing and drum toward the end of the arm, and means mounted on the end of the arm and engaging said first flange of said drum for moving said drum and housing along the arm away from the end in opposition to the urging of said resilient means for establishing an engagement of the surfaces of said second flange and said housing, said engagement establishing the amount of frictional resistance to rotation exerted by said housing on said drum, said resistance being sufficient to prevent movement of said drum responsive to normal movements of the animal on the raised work surface, but permitting movement of the animal responsive to the weight of the animal falling off the raised work surface for paying out said cord.

2. The improved tethering device of claim 1 wherein said resilient means comprises a spring surrounding the arm and bearing on said housing for providing the resilient bias on said housing.

3. The improved tethering device of claim 1 wherein the end of the arm is threaded and said movement means for said drum and housing comprises a nut threaded on the end of the arm engagable with said first flange of said drum.

4. The improved tethering device of claim 1 including means manipulatable by hand for rotating said drum against the frictional resistance for wrapping said cord around said drum.

5. The improved tethering device of claim 4 wherein said first flange extends outside of said tubular wall of said housing and said rotating means comprises a crank coupled to said first flange.